United States Patent Office 3,102,862
Patented Sept. 3, 1963

3,102,862
WAX-LIKE TELOMER COMPOSITIONS
Larry Quentin Green, Graylyn Crest, Wilmington, Del., and Ralph Walter Moses, Deepwater, N.J., assignors to E. I. du Pont de Nemours and Company, Wilmington, Del., a corporation of Delaware
No Drawing. Filed Sept. 14, 1961, Ser. No. 137,953
4 Claims. (Cl. 252—28)

This invention is directed to a novel composition comprising a fluorocarbon telomer and a sodium silicate, and more particularly, with a composition comprising a fluorocarbon telomer having wax-like characteristics dispersed with the aid of a dispersing agent in a water solution of a sodium silicate in which the ratio of $Na_2O:SiO_2$ varies from 1:1 to 1:4. The wax-like fluorocarbon telomer is preferably obtained by reacting tetrafluoroethylene in the presence of a telogen such as methylcyclohexane and a reactive telogenic solvent such as 1,1,2-trichlorotrifluoroethane. The wax-like material is a normally solid, essentially non-distillable, open-chain, highly crystalline product having a number average molecular weight in the range 1300 to 15,000, a crystalline melting point in the range 225° to 320° C., specific infrared ratios at 3.4 microns of from 0.05 to 3.5 and at 10.4 microns of from 0.05 to 3.0, a chlorine content of from 0.05% to 2.0% by weight, a hydrogen content of from 0.05% to 2.0% by weight and a lamellar arrangement of sheet-like crystals, these terms being defined hereinafter. The resultant dispersion of the telomer in excess of the 1,1,2-trichlorotrifluoroethane is dried by evaporation of the solvent and then pulverized. The finely-divided dry telomer is wetted with a water solution or slurry of a dispersing agent and mixed with the sodium silicate solution to produce a composition which is useful as a source of a dry lubricant exhibiting improved abrasion resistance by which the durability and usefulness of films of the lubricant are markedly increased.

Films or coatings of the wax-like fluorocarbon telomer alone on hard, smooth, particularly metal, surfaces are too readily and easily removed by mechanical abrasion; the lubrication provided by the applied material is too soon lost. To restore and maintain the lubrication, repeated applications of the lubricant must be made when the film or coating is subjected to repeated rubbing, particularly rubbing under quite moderate pressure. A problem has been to increase the adherence of the fluorocarbon telomer to the surface of metal so that the life of the lubricating film would be extended, the cost of the labor and material to replace it would be reduced, and applications which required an initial durable lubricant film would be feasible.

It is therefore, an object of the present invention to provide a film or coating of a wax-like telomer of tetrafluoroethylene which film or coating exhibits an increased abrasion resistance and functions as a lubricant for extended periods under pressure on the surfaces to which it is applied. This and other objects will become apparent in the following description and discussion.

A paper presented by Devine, Lampson, and Bowen of the Naval Air Material Center, Philadelphia, at the Cleveland meeting of the ACS in April 1960 and summarized in Lubrication Under Extreme Conditions, a symposium sponsored by the Div. of Petroleum Chemistry, vol. 5, No. 2–B, April 5–14, 1960, describes the increased resistance to abrasion imparted to dry lubricants based upon molybdenum disulfide and graphite by sodium silicate. Sodium silicate similarly forms a binding film with the fluorocarbon telomer lubricant of the present invention. The herein described and claimed invention composition is white or colorless in contrast to the prior art black disulfide and graphite film and requires a surface active agent to disperse the fluorocarbon telomer lubricant in the sodium silicate solution.

There is no known established equivalency of molybdenum disulfide and graphite and the fluorocarbon telomer lubricant. There is a need for a surface active agent in the composition of the present invention and there is no teaching of its use in the silicate composition of the article heretofore referenced. U.S. Patent 2,710,226 pertains to the use of sodium silicate in aqueous dispersions of "Teflon" polytetrafluoroethylene to provide crack-free films of "Teflon" and to provide "Teflon" coating compositions with improved adhesion to metal. The products of this patent are used to coat metals, ceramics, glass fabrics, asbestos fabrics, woven wire fabrics, and heat treated polyacrylonitrile fabrics. Specific uses of the patent products include coated glass fabrics, unsupported films, anti-sticking coatings for muffin tins or cookie sheets, electrically insulated coatings for wire, spark plugs and condensers, and corrosion resistant interior coatings for metal tanks containing corrosive chemical materials. The high molecular weight polymers of tetrafluoroethylene with which the reference patent deals are well outside the scope of the telomers of the subject invention which are relatively low in molecular weight and are soft, wax-like lubricants. Comparative lubricity tests show that "Teflon"-silicate mixtures have failed as lubricants under load in 1 to 3 minutes while the tetrafluoroethylene telomer-silicate mixtures of the present invention have withstood the same stresses for over 20 minutes.

More specifically, the present invention is directed to a composition comprising a mixture of (a) one part of a dry, pulverulent tetrafluoroethylene telomer produced by reacting one mole of tetrafluoroethylene, at a temperature within the range of 75° to 200° C. in the presence of from about 1.7 moles to 15 moles of trichlorotrifluoroethane, from 0.01 to about 0.6 mole of an active telogen and from about 0.05% to 3%, by weight, based on the tetrafluoroethylene of an organic peroxide, evaporating the excess trichlorotrifluoroethane, and grinding the resulting telomer, (b) from 0.2 part to one part of a sodium silicate represented by the formula $Na_2O \cdot XSiO_2$ where X is an integer 1 to 4, (c) from 0.005 to 0.2 part of a surface active dispersing agent, and (d) from 0.5 part to 4 parts of water. Preferred embodiments of the present invention include those compositions in which the active telogen is methylcyclohexane, methanol and dimethyldisulfide.

The present invention telomer, with wax-like properties, well adapted for use as a lubricant, and employed in mixtures with aqueous solutions of sodium silicates, is that prepared by polymerizing 1 mole of tetrafluoroethylene in the presence of about 1.7 moles to 15 moles of trichlorotrifluoroethane and 0.01 to about 0.6 mole of an active telogen, this polymerization being carried out in a closed system with a peroxide catalyst at a temperature within the range of 75° C. and 200° C. and at autogenous pressure.

This telomer dispersed in 1,1,2-trichlorotrifluoroethane is obtained by use of telomerization techniques, as described, for example, in U.S. Patent No. 2,540,088. In general, the telomerization is carried out by first charging an autoclave or other pressure vessel with an active telogen, with trichlorotrifluoroethane, with a peroxide catalyst and then introducing tetrafluoroethylene gas under pressure or by passing it into the cooled reactor. The charged reaction vessel is then heated to a temperature between 75° and 200° C. and the reaction allowed to proceed. Pressures will be generated between about 300 and 600 p.s.i.g. and as the reaction nears completion, the pressure within the system will be observed to drop.

In preparing this tetrafluoroethylene telomer dispersed in 1,1,2-trichlorotrifluoroethane, it is necessary to control carefully the amounts of tetrafluoroethylene, trichlorotrifluoroethane and active telogen. For each mole of tetrafluoroethylene, it is necessary to have present, in the reaction mass, 1.7 moles to 15 moles of trichlorotrifluoroethane, and, from about 0.01 to about 0.6 mole of active telogen. If less than 0.01 mole of active telogen is used, the product is of higher molecular weight and is less wax-like, approaching, as the telogen is decreased, polytetrafluoroethylene itself. If much above 0.6 mole active telogen is used per mole of tetrafluoroethylene, the molecular weight becomes too low and the properties of the product progress from wax-like to grease-like to liquid as the amount of active telogen increases. On the other hand, if much more than 15 moles of trichlorotrifluoroethane are used per mole of tetrafluoroethylene, the dispersion is too dilute for practical purposes. If less than about 1.7 moles of the trichlorotrifluoroethane are used, the viscosity of the resultant product is very high, resulting in poor heat transfer during preparation. It is important to carry out the process within the ratios described to obtain the present novel dispersion.

It has been established by chemical analysis that the trichlorotrifluoroethane takes part in the telomerization process; said trichlorotrifluoroethane acts as a telogen to some extent. Thus, it follows that the wax-like products obtained are probably mixtures of telomers containing the reaction products of tetrafluoroethylene with trichlorotrifluoroethane as well as the active telogens. The final product, then, is a dispersion of these wax-like compounds in the trichlorotrifluoroethane.

The trichlorotrifluoroethane may be either isomer, i.e., it may be 1,1,1-trichlorotrifluoroethane or 1,1,2-trichlorotrifluoroethane; it is preferred to use the latter isomer.

The term "active telogen" utilized according to the present invention describes a telogen which, on reaction with tetrafluoroethylene without solvent, produces low molecular weight products whose molecules contain predominantly one or two tetrafluoroethylene units per active telogen unit. Such active telogens are well known in the art and include numerous compounds. Representative active telogens are tertiary hydrocarbons such as isobutane, methylcyclopropane, 2,3-dimethylbutane, methylcyclohexane, etc; aliphatic ethers with alpha hydrogen atoms such as tetrahydrofuran, diethylether, dioxane, etc.; tertiary aliphatic amines such as trimethylamine, triethylamine, etc.; aliphatic alcohols containing an alpha hydrogen such as methanol, ethanol, isopropanol, sec-butyl alcohol, cyclohexanol, etc.; bivalent aliphatic sulfur compounds such as ethyl mercaptan, dimethyldisulfide, diethyldisulfide, dipropyldisulfide, etc.; aliphatic carbonyl compounds such as aldehydes, ketones, diketones, acids, esters, etc. containing an alpha hydrogen atom such as acetaldehyde, acetone, methyl ethyl ketone, 2,4-pentanedione, ethyl acetoacetate, isobutyric acid and the like; dialkyl phosphites such as dimethyl phosphite and diethyl phosphite and dialkylamides such as dimethylformamide.

The active telogen, although present in very small amounts, contributes significantly to the obtaining of the fluorocarbon telomer without undesirable by-products. If the telomerization is carried out without the active telogen, high molecular weight products are obtained which are not wax-like. The presence of the active telogen in the amounts specified results in products having a molecular weight in the order of from 1300 to 15,000; TFE polymers of this molecular weight have wax-like properties.

As indicated, the reaction is carried out with a peroxide catalyst. This catalyst may be any organic peroxide which generates free radicals at the reaction temperature. Based on availability of catalysts and convenience, temperatures of about 75° C. to about 200° C. will usually be used, and the catalyst employed will be chosen according to its ability to generate free radicals at the specific temperature selected. The catalyst usually employed will be benzoyl peroxide, di-tert-butyl peroxide, or ethyl peroxide. With di-tert-butyl peroxide which is the preferred catalyst, a temperature of 130° C. to 170° C. will be used. The concentration of catalyst taken will usually be in the range of .05% to 3% by weight of TFE, the preferred amount being about 2%.

The preferred telomer is that prepared by reacting tetrafluoroethylene in the presence of 1,1,2-trichlorotrifluoroethane, methylcyclohexane, and di-tert-butyl peroxide. By way of illustrating how the telomer may be prepared the following procedure is given.

A clean, dry 10-gallon stainless steel, steam-jacketed autoclave, equipped with a cooling coil, anchor-type agitator, and intake and discharge tubes, is flushed with nitrogen and filled with a solution of 1,1,2-trichloro-trifluoroethane containing 0.76% by weight of methylcyclohexane and 0.28% by weight of di-tert-butyl peroxide. The take-off valve is set for 600 p.s.i.g. and the temperature raised to 160° C. The above 1,1,2-trichlorotrifluoroethane solution is then fed to the autoclave at a rate of 68.7 lbs. per hour. At the same time tetrafluoroethylene under a pressure of 650 to 750 p.s.i.g. is introduced into the autoclave at a rate of 20 lbs. per hour. When a steady reaction state is reached a dispersion of a tetrafluoroethylene telomer dispersed in 1,1,2-trichlorotrifluoroethane at a solids concentration of about 20% is obtained.

The 20% dispersion of the tetrafluoroethylene telomer in 1,1,2-trichlorotrifluoroethane as obtained by the above process will normally be evaporated to dryness to isolate the tetrafluoroethylene telomer. The telomer will be comminuted, wetted with a solution of dispersing wetting agent, and then dispersed in a water solution of a sodium silicate to compose the invention composition.

In characterizing the telomer of the invention composition the usual methods for determining the number average molecular weight, viz., freezing point depression or boiling point elevation, are not applicable due to the extreme insolubility and chemical inertness of the telomer. The number average molecular weight is therefore determined by either end group analysis or by calculation based on the crystalline melting point of the product using the relationship derived by Flory as described in his text book "Principles of Polymer Chemistry," published by the Cornell University Press. The equation described in Chapter 13 is $$\frac{1}{T_m} - \frac{1}{T_m°} = \left[\frac{R}{\Delta H_u}\right]\left[\frac{2}{\overline{X}_n}\right]$$

wherein $T_m$ is the crystalline melting point in °K., $T_m°$ is the melting point of pure $CF_2$ polymer (600° K.), R=gas constant (2.0 calories/mole degree), $\Delta H_u$=heat of fusion per mole of $CF_2$ units (685 calories) and $\overline{X}_n$=number average of $CF_2$ units. Since the weight of the $CF_2$ unit is 50, the number average molecular weight ($\overline{M}_n$) of the present products becomes $\overline{M}_n = 50\overline{X}_n$. By substitution of the above values in the equation of Flory, it reduces to $$\overline{M}_n = \frac{200}{685\left[\frac{1}{T_m} - \frac{1}{100}\right]}$$

The crystalline melting point of a product is the point where the last traces of crystallinity disappear. This point can be determined in several ways, viz., the loss of birefringence as observed through crossed polarizers of a hot stage microscope, by taking X-ray diagrams at various temperatures and noting the temperature at which the crystalline diffraction rings completely disappear or by the dilatometric method (see Tobolsky, "Properties and Structures of Polymers," Wiley, 1960, pp. 46–47). The first method is most convenient.

The term specific infrared ratio at 3.4 microns as used above refers to the net absorbance in the infrared at a wave length of 3.4 microns divided by the net absorbance in the infrared at a wavelength of 4.3 microns of a film of approximately 0.1 mm. thickness. Such films are obtained by pressing a dry powder sample of the product at room temperature and a pressure of 20,000 to 40,000 p.s.i. The term "net absorbance" means the total absorbance corrected for any background absorbance. To determine the net absorbance, a line is drawn at the level of the background absorbance and the distance to the peak is measured. The technique is more fully described in Weissberger, "Techniques of Organic Chemistry," 2nd ed., vol. 1, pt. II, pp. 1295–1299; Lothian "Absorption Spectrophotometry," pp. 19–23, Wright, Anal. Chem., 13, 1 (1941) and Heigl et al., Anal. Chem., 19, 293 (1947).

In carrying out the determinations, the film is mounted between sodium chloride plates and the absorbance spectrum is determined in the conventional way in a nitrogen atmosphere using an infrared spectrophotometer fitted with sodium chloride optics. The specific infrared ratio at 3.4 microns is related to the C—H content of the product.

The specific absorbance of 10.4 microns is determined in the same manner by dividing the net absorbance at 10.4 microns by the net absorbance at 4.3 microns. This absorbance is related to the chlorine content of the product.

X-ray diffraction patterns of the telomers of this invention show that they are well ordered products possessing a high degree of crystallinity with essentially no amorphous structure. The general method for estimating the relative amount of amorphous and crystalline material by X-ray diffraction is well known (see Billmeyer, "Textbook of Polymer Chemistry," Interscience Publishers, 1957, pp. 33–34).

The very thin, sheet-like lamellar structure of the telomers is shown by electron photomicrographs prepared by conventional electronmicroscopy techniques. By shadow casting techniques, the individual sheet-like crystals have been shown to have thicknesses of the order of 100 Angstrom units or less.

Some representative telomers made and characterized by the above procedure have the following characteristics.

| Active telogen | Telomer, mol. wt. | Crystalline, M.P., °C. | Specific infrared ratios | | Cl, percent | H, percent | Other, percent |
| --- | --- | --- | --- | --- | --- | --- | --- |
| | | | 3.4 | 10.4 | | | |
| Methylcyclohexane | 3,100 | 294 | 1.99 | 1.31 | 1.20 | 0.60 | |
| Methanol | 2,000 | 278 | 0.38 | 0.96 | 0.60 | 0.17 | |
| Dimethyl disulfide | 2,000 | 279 | 0.42 | 1.80 | 0.30 | 0.20 | Sulfur, 2.2. |
| Diethyl ether | 1,500 | 266 | 1.41 | 1.26 | 0.92 | 0.70 | |
| 2,4-Pentanedione | 9,400 | 316 | 0.32 | 0.32 | 0.08 | 0.25 | |
| Triethylenediamine | 3,400 | 297 | 1.20 | 0.94 | 0.88 | 1.00 | Nitrogen, 2.0. |
| N,N-Dimethylformamide | 3,700 | 300 | 0.86 | 0.36 | 0.25 | 0.32 | Nitrogen, 0.5. |
| Diethyl phosphite | 2,700 | 290 | | | 1.85 | 0.50 | Phosphorus, 2.45. |

The surface active agent used to wet the tetrafluoroethylene telomer and to disperse it in the sodium silicate solution may be of the anionic, cationic, or non-ionic type. It is used as a 1% to 20% water solution to treat the dry pulverant telomer, the amount of surface active agent employed being from 0.5% to 20% of the fluorocarbon telomer, preferably from 0.6% to 10%.

The anionic surface active agents that may be employed are those well known in the art and include sodium oleate, sodium stearate, sodium salt of wood rosin acids, potassium salt of dehydrogenated wood rosin, alkyl ($C_{12}$–$S_{16}$) sodium sulfate, sodium salt of sulfated alkenyl ($C_{16}$–$C_{18}$) acetate, alkyl ($C_{12}$–$C_{16}$) bis-(2-hydroxyethyl)ammonium sulfate, sodium $\theta$-sulfato-(methyl stearate), sodium salt of isopropylated naphthalenesulfonic acid, sodium salt of alkyl ($C_{12\ average}$) benzenesulfonic acid, sodium salt of aliphatic hydrocarbon (from #40 white oil) sulfonic acid. The cationic surfactants that may be employed include dodecyltrimethylammonium acetate, trimethyltetradecylammonium chloride, (dodecylmethylbenzyl)trimethylammonium chloride, N-(2-diethylaminoethyl)oleamide hydrochloride, 1,1′,1″,1‴ - (ethylenedinitrilo)tetra-2-propanol dioleate singly quaternized with dimethyl sulfate. Non-ionic surface active agents that may be employed include condensation products of ethylene oxide with hexyl phenol, isooctyl phenol, hexadecanol, oleic acid, alkanethiol ($C_{12}$–$C_{1}$), alkyl ($C_{12}$–$C_{18}$) amines, sorbitan monolaurate.

The sodium silicate solutions are produced by dissolving in water sodium silicate $Na_2SiO_3 \cdot 9H_2O$ which provides the 1:1 $Na_2O$:$SiO_2$ compound and adding to the solution of this compound appropriate amounts of silicic acid ($H_2SiO_3$) to provide the sodium silicates having $Na_2O$:$SiO_2$ ratios of 1:2, 1:3, and 1:4. Solutions of the sodium silicates will vary in concentration from about 5% to about 55% by weight of sodium silicate, preferably from 20% to 40%.

The invention composition is applied to the hard, smooth surface of metal, glass, and plastics, by spraying, dipping, brushing, and roll-coating. It may be employed as the lubricant in such operations as wire drawing, tube drawing, metal stamping, metal extrusion, and metal punching. It provides a lubricant for bearing surfaces under high load such as the moving and sliding metal and plastic parts in thrust washers, bearings, gears, drill bits, railroad car journals, wire rope, and conveyor chains.

A convenient way to measure the lubricity of lubricant films and the durability of such films is to subject the film to a test of its load carrying capacity. One such test used is the Falex test described by E. G. Ellis in "Lubricant Testing," Scientific Publication, Great Britain, 1953, pp. 150–153.

Representative examples illustrating the present invention follow.

*Examples 1 to 8*

Four, ten, and twenty parts of a tetrafluoroethylene telomer in a dry, powdered form produced as described above employing methylcyclohexane as the active telogen were wetted with 1.25 parts of a 5% water solution of a dispersing agent comprised of the condensation product of ethylene oxide and isooctylphenol. The mass of wax-like fluorocarbon material treated with the dispersing agent was then dispersed in 16 parts of a 25% water solution of a sodium silicate prepared as already described. The resulting dispersion was applied to the journals and bushings of a Falex Lubricity Tester. The coated members were dried in the air and heated for 10 minutes at 200° C. The tester was assembled, and the load carrying capacity of the lubricant film was measured by applying progressively loads of 100, 200, 300 and 400 lbs. for three minute intervals each and, finally, if the film was still capable of providing lubricity, of 500 lbs. until excessive wear became apparent.

Whereas coatings of the sodium silicates alone do not survive the break-in period at 100-pound and 200-pound loadings and the fluorocarbon telomer applied without the silicate binder usually fails at the loadings of 200 pounds or 300 pounds during the break-in, the combination of the silicate and the telomer withstands the applied loads and permits operating of the tester for many minutes at the 500-pound loading. The endurance of telomer-silicate films made with the different sodium silicates and varying telomer to silicate ratios is as follows.

| Ex. | Amount of telomer used, parts per 4 parts of dry sodium silicate | Ratio of Na$_2$O:SiO$_2$ in sodium silicate | Endurance of lubricant film a 500 lbs. load in minutes |
| --- | --- | --- | --- |
| 1 | 4 | 1:1 | 15 |
| 2 | 4 | 1:4 | 6 |
| 3 | 10 | 1:1 | 20 |
| 4 | 10 | 1:2 | 15 |
| 5 | 10 | 1:3 | 27 |
| 6 | 10 | 1:4 | 15 |
| 7 | 20 | 1:3 | 27 |
| 8 | 20 | 1:4 | 18 |

A similar telomer-silicate mixture was made by dispersing 12 parts of the wetted pulverulent tetrafluoroethylene telomer produced with methanol as the active telogen, i.e. methanol was employed in the place of the methylcyclohexane in the above described process) in 20 parts of a 1:1 sodium silicate in 40% solution and tested as described in the foregoing examples. The lubricant film bore the 500 pound load, after the usual break-in period, for 15 minutes before appreciable wear occurred. When a telomer made with dimethyl disulfide was similarly tested in combination with a 1:1 sodium silicate the tester ran for 12 minutes at the 500-pound load before significant wear was observed. Similarly, when telomers made with diethyl ether, 2,4-pentanedione, triethylenediamine, N,N-dimethylformamide, and diethyl phosphite and having the characteristics given above are tested with 1:1 sodium silicate the tester will be found to run at least 10 minutes at the 500 lb. load before appreciable wear is observed.

In place of the ethylene oxide condensation product such surface active agents as the condensation product of ethylene oxide and hexyl phenol, the sodium salt of isopropylated naphthalenesulfonic acid, alkyl ($C_{12}$–$C_{16}$) sodium sulfate, sodium salt of aliphatic hydrocarbon (from #40 white oil) sulfonic acid, alkyl ($C_{12}$–$C_{16}$) bis-(2-hydroxyethyl)ammonium sulfate, and 1,1′,1″,1‴-(ethylenedinitrilo)tetra-2-propanol dioleate singly quaternized with dimethyl sulfate were employed as wetting and dispersing agents for the wax-like tetrafluoroethylene telomer, and the resultant lubricant films of the telomer mixed with sodium silicate of the already set forth compositions exhibited high load carrying capacity.

It is understood that the preceding examples which examples are representative, may be varied within the scope of the total specification disclosure by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition consisting of a mixture of (a) one part of a wax-like, normally solid and essentially non-distillable open-chain highly crystalline reaction product of (1) tetrafluoroethylene, (2) a solution of an active telogen in trichlorotrifluoroethane and (3) a free radical generating organic peroxide catalyst, said reaction product having a number average molecular weight in the range 1300 to 15,000, a crystalline melting point in the range 225° to 320° C., specific infrared ratios at 3.4 microns of from 0.05 to 3.5 and at 10.4 microns of from 0.05 to 3.0, a chlorine content of from 0.05% to 2.0% by weight, a hydrogen content of from 0.05% to 2.0% by weight and a lamellar arrangement of sheet-like crystals, (b) from 0.2 part to one part of a sodium silicate represented by the formula Na$_2$O·XSiO$_2$ where X is an integer 1 to 4, (c) from 0.005 to 0.2 part of a surface active dispersing agent, and (d) from 0.5 to 4 parts of water.

2. A composition according to claim 1 wherein the active telogen is methylcyclohexane.

3. A composition according to claim 1 wherein the active telogen is dimethyldisulfide.

4. A composition according to claim 1 wherein the active telogen is methanol.

References Cited in the file of this patent
UNITED STATES PATENTS
2,540,088    Barrick _____ Feb. 6, 1951